United States Patent
Okabe et al.

(10) Patent No.: US 6,509,522 B1
(45) Date of Patent: Jan. 21, 2003

(54) THREE-PHASE INTEGRATED GAS INSULATED BUS

(75) Inventors: Mamoru Okabe, Hitachi (JP); Hitoshi Yamada, Hitachinaka (JP); Toshihisa Miyamoto, Hitachi (JP); Isamu Ozawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/080,593

(22) Filed: Feb. 25, 2002

(30) Foreign Application Priority Data

Nov. 13, 2001 (JP) ........................................ 2001-347347

(51) Int. Cl.⁷ ................................................ H02G 5/06
(52) U.S. Cl. ........................................................ 174/28
(58) Field of Search ............................ 174/24, 27, 28, 174/99 R, 99 B, 99 E, 25 G, 21 C

(56) References Cited

U.S. PATENT DOCUMENTS 2,197,027 A * 4/1940 Witt ............................ 333/244
3,808,351 A * 4/1974 Moisson-Franckhauser et al. ............................................................. 174/15.5
5,860,768 A * 1/1999 Moritz ..................... 405/154.1

FOREIGN PATENT DOCUMENTS

JP          55-103023          8/1980

* cited by examiner

Primary Examiner—Chau N. Nguyen
(74) Attorney, Agent, or Firm—Mattingly, Stanger & Malur, P.C.

(57) ABSTRACT

In a three-phase integrated gas insulated bus, three vertical outlets 3 are formed in the longitudinal direction of a cylindrical bus enclosure 1 and three horizontal outlets are formed in almost the same axial position as these vertical outlets 3 in the circumferential direction. The three-phase main bus conductors 7 are laid out to ensure that one side of a triangle having the apexes where three-phase main bus conductors 7 are located is approximately parallel to these horizontal outlets 4. The main bus conductors 7 are extended to the three vertical outlets 3 sequentially starting from the main bus of the phase closest to the vertical outlets 3, and branch buses 8 and 9 are led from the tip positions thereof to the vertical outlets 5 and horizontal outlets 6.

5 Claims, 3 Drawing Sheets

THREE-PHASE INTEGRATED GAS INSULATED BUS

BACKGROUND OF THE INVENTION

1. Field of the Invention

The present invention relates to a three-phase integrated gas insulated bus used in a gas insulated switchgear.

2. Description of Prior Arts

As is widely known, a gas insulated switch gear is often used for switching in the electric power system. The main bus of the gas insulated switch gear is configured in a double bus system to ensure a stable supply of power. Further, the main bus is provided in an isolated phase arrangement or integrated three-phase arrangement.

The integrated three-phase arrangement of the main bus is formed in such a way that a three-phase main bus conductor is supported by an insulation spacer to be located at the apex of a triangle in an insulated gas-filled cylindrical bus enclosure. The triangle is normally configured in an isosceles triangle.

In the gas insulated switch gear, a branch bus is led from the three-phase integrated bus. The method for leading a branch bus from a three-phase integrated bus is disclosed, for example, in the Japanese Application Patent Laid-Open Publication No. Sho 55-103023.

The branch bus led from the three-phase integrated bus must be led in two directions because of the mechanical layout configuration of the gas insulated switch gear. These directions are a vertical direction (upward or downward) or horizontal direction.

In the prior art, the size of the bus enclosure (cross section) is restricted when the branch bus is led in two directions from the three-phase integrated bus from the view point of ensuring a compact configuration of the gas insulated switch gear. So the branch bus is led in one direction and in the other direction from two bus enclosures, respectively.

SUMMARY OF THE INVENTION

In the prior art, a branch bus is led in two directions using two bus enclosures. If the main bus is longer, two bus enclosures must be used, imposing restriction on the size of the gas insulated switch gear with the result that a compact product cannot be manufactured.

The object of the present invention is to solve the aforementioned problem and to provide a three-phase integrated gas insulated bus which ensures compact configuration of a gas insulated switch gear, wherein the branch bus is led in two directions from one bus enclosure.

The present invention is characterized as follows: Three vertical outlets are formed in the longitudinal direction of a cylindrical bus enclosure and three horizontal outlets are formed in almost the same axial position as these vertical outlets in the circumferential direction. The three-phase main bus conductors are laid out to ensure that one side of a triangle having the apexes where three-phase main buses are located is approximately parallel to these horizontal outlets. The main bus conductors are extended to the three vertical outlet positions sequentially starting from the main bus of the phase closest to the vertical outlets, and branch buses are led from the tip positions thereof to the vertical outlets and horizontal outlets.

In other words, the present invention is characterized in that a three-phase bus is connected to one of three vertical outlets (vertical outlets) formed in the longitudinal direction of a cylindrical bus enclosure, a two-phase bus is connected to two of them, and a one-phase bus is connected to three of them; and a branch bus is led from the tip of the main bus conductor of each phase.

In the present invention, main bus conductors are connected to the three vertical outlet positions sequentially starting from the main bus closest to the three vertical outlets formed in the longitudinal direction of the cylindrical bus enclosure, and branch buses are led out from the tip positions. This ensures the insulation distance of each phase bus, and further, allows branch buses to be lead out of one bus enclosure in two directions, whereby a compact configuration of a gas insulated switch gear is ensured.

DESCRIPTION OF EMBODIMENTS

Figure 1:
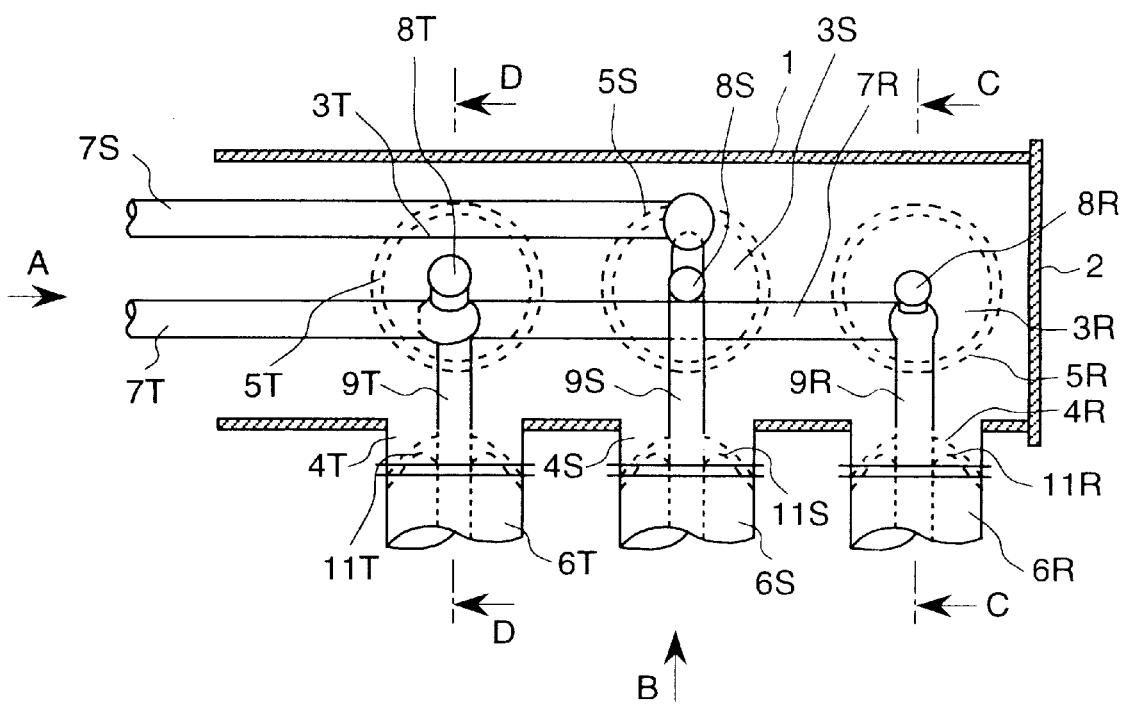
FIG. 1 is a top view with partial cutaway view representing a three-phase integrated gas insulated bus according to the present invention.
Figure 2:
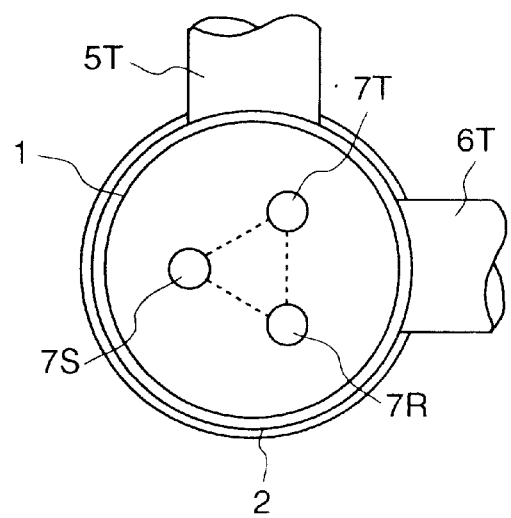
FIG. 2 is a view A taken in arrow direction of FIG. 1.
Figure 3:
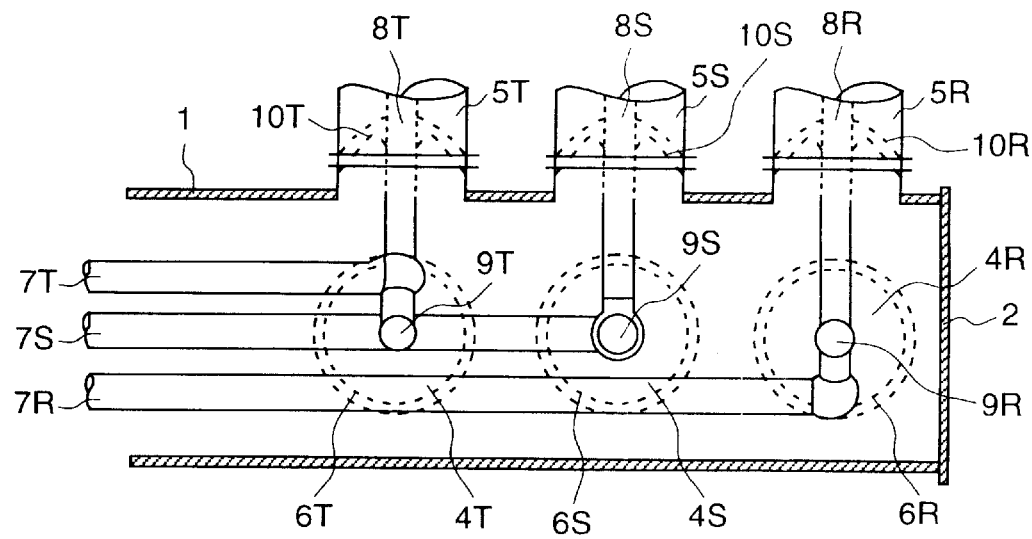
FIG. 3 is a view B taken in arrow direction of FIG. 1.
Figure 4:
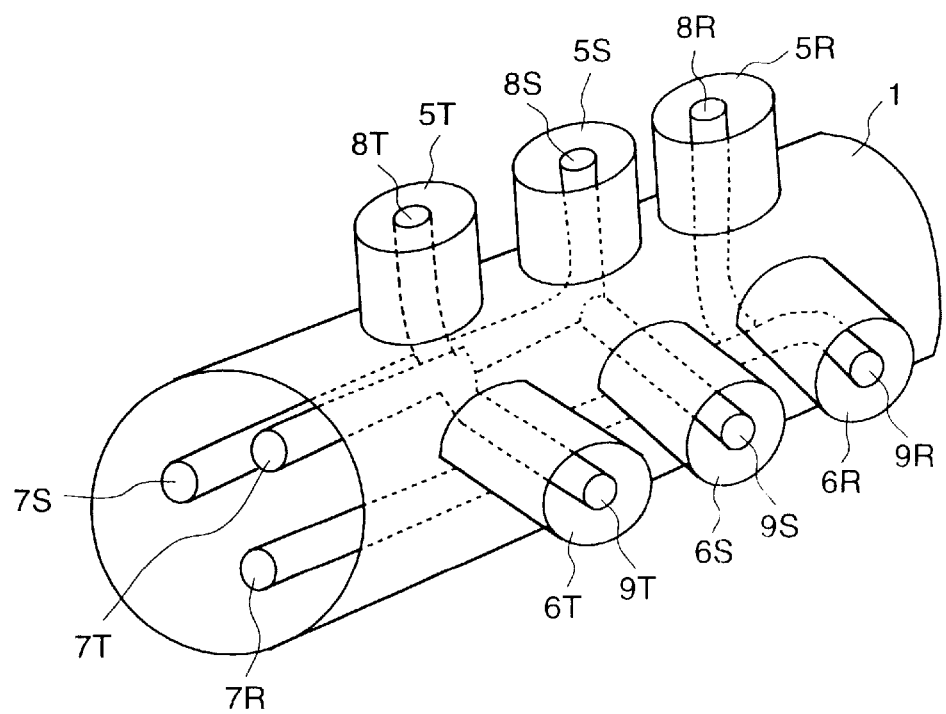
FIG. 4 is a perspective view representing the connection between main bus and branch bus.

The following describes one embodiment of the present invention with reference to drawings:

FIG. 1 is a top view with partial cutaway view representing a three-phase integrated gas insulated bus according to the present invention. FIG. 2 is a view A taken in arrow direction of FIG. 1. FIG. 3 is a view B taken in arrow direction of FIG. 1. FIG. 4 is a perspective view representing the connection between main bus and branch bus.

In FIGS. 1 to 4, the cylindrical bus enclosure 1 is formed of such a metal as stainless steel, and is enclosed with a flange 2 mounted on one side by bolts. The bus enclosure 1 is filled with insulated gas. Three vertical outlets 3R, 3S and 3T are formed on the top face of the bus enclosure 1 in the longitudinal direction (axial direction). These vertical outlets 3R, 3S and 3T are formed in a straight line on the same axis in the longitudinal direction. Vertical branch pipes 5R, 5S and 5T are connected to the vertical outlets 3R, 3S and 3T and are fixed thereon. Flanges of the vertical branch pipes 5R, 5S and 5T are fixed on the bus enclosure 1 by bolts. Since FIG. 1 gives a partially cutaway view of the bus enclosure 1, the vertical outlets 3R, 3S and 3T and the vertical branch pipes 5R, 5S and 5T are indicated by broken lines.

On the horizontal surface approximately 90 degrees shifted from the vertical outlets 3R, 3S and 3T of the bus enclosure 1, three horizontal outlets 4R, 4S and 4T are formed in the longitudinal direction. The horizontal outlets 4R, 4S and 4T are formed on the same axis (same position) as vertical outlets 3R, 3S and 3T in the circumferential direction. Further, similarly to the case of vertical outlets 3R, 3S and 3T, the horizontal outlets 4R, 4S and 4T are formed directly on the same axis as the bus enclosure 1 in the longitudinal direction.

Horizontal branch pipes 6R, 6S and 6T are connected to the horizontal outlets 4R, 4S and 4T and are fixed thereon.

The flanges of horizontal branch pipes 6R, 6S and 6T are connected to the bus enclosure 1 by bolts. Since FIG. 3 gives a partially cutaway view of the bus enclosure 1, the horizontal outlets 4R, 4S and 4T and horizontal branch pipes 6R, 6S and 6T are indicated by broken lines.

Three-phase main buses 7R, 7S and 7T are led into the bus enclosure 1 in an isolated-phase system and are supported by an insulation spacer so that they are located at the apexes of a triangle (isosceles triangle), as shown in FIG. 2. Insulation spacers in the axial direction (in the longitudinal direction) of the bus enclosure 1 are not illustrated. Main buses 7R, 7S and 7T are laid out in such a triangular form that the distance between the main buses 7S and 7R is equal to the distance between the main buses 7S and 7T.

Figure 7:
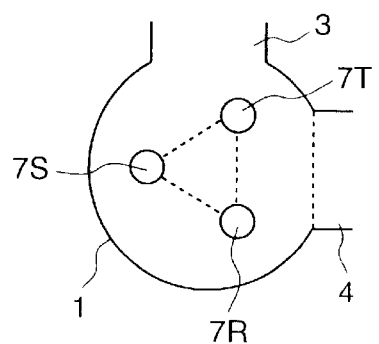
FIG. 7 is a drawing representing the arrangement of main buses in a bus enclosure.

Main buses 7R and 7T are laid out to ensure that one side (base) of the triangle formed between the main buses 7R and 7T is approximately parallel to the horizontal outlets 4, as shown in FIG. 7. In other words, main buses 7R and 7T are located approximately in the same vertical direction as that of vertical outlets 3 (vertical branch pipes 5). When three-phase main buses 7R, 7S and 7T are viewed in the vertical direction, the main bus 7T is located on the highest apex of the triangle close to vertical outlets 3, and the main bus 7S and main bus 7R are laid out in that order, as shown in FIG. 3.

The main bus 7T located at the highest apex of the triangle is extended to the horizontal outlet 3T (vertical outlet 4T) formed at the position shortest from the position where three-phase main buses 7R, 7S and 7T are connected to the bus enclosure 1. The vertical branch bus 8T and horizontal branch bus 9T are led out from the tip thereof.

The vertical branch bus 8T is supported by the insulation spacer 10T, and is led out to the vertical branch pipe 5T. Further, the horizontal branch bus 9T is supported by an insulation spacer 11T, and is led out to the horizontal branch pipe 6T. The vertical branch bus 8T is led out upwardly of the bus enclosure 1, and the horizontal branch bus 9T is led out in the horizontal direction.

From the main bus 7S located at the mid-position apex of the triangle, the vertical branch bus 8S and horizontal branch bus 9S are lead out at the horizontal outlet 3S (vertical outlet 4S) formed on the bus enclosure 1. The vertical branch bus 8S is supported by the insulation spacer 10S, and is led out to the vertical branch pipe 5S. The horizontal branch bus 9S is supported by the insulation spacer 11S and is led out to the horizontal branch pipe 6S.

From the main bus 7R located at the lowest apex (low position) of the triangle, the vertical branch bus 8R and horizontal branch bus 9R are branched and lead out at the horizontal outlet 3R (vertical outlet 4R) formed on the bus enclosure 1. The vertical branch bus 8R is supported by the insulation spacer 10R, and is led out to the vertical branch pipe. The horizontal branch bus 9R is supported by the insulation spacer 11R, and is lead out to the horizontal branch pipe 6R.

Figure 5:
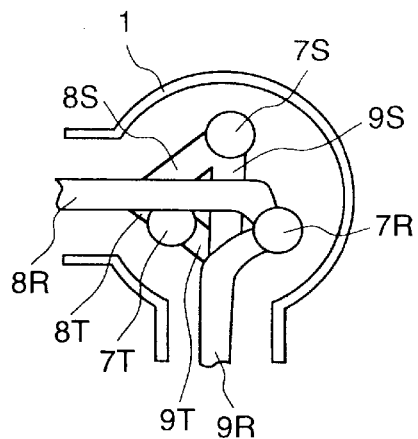
FIG. 5 is a view C-C taken in arrow direction of FIG. 1.
Figure 6:
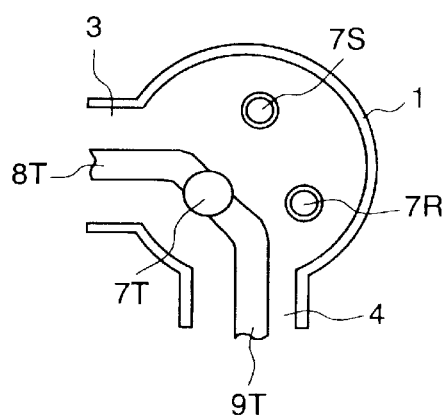
FIG. 6 is a view B-B taken in arrow direction of FIG. 1.

In the manner as stated above, branch buses 8 and 9 are led out in two directions from one bus enclosure 1 incorporating the three-phase main bus 7. The branch buses 8T and 9T are led out to the T-phase main bus 7T at point D of FIG. 1 (vertical outlet 3T) as shown in FIG. 6. Further, vertical branch buses 8R, 8S and 8T and horizontal branch buses 9R, 9S and 9T are led out from the three-phase main buses 7R, 7S and 7T at point C of FIG. 1 (vertical outlet 3R) as shown in FIG. 5.

This will be described with reference to three-phase main buses 7R, 7S and 7T: Three-phase main buses 7R, 7S and 7T are led to one (vertical outlet 3T) of three vertical outlets 3 (horizontal direct outlets 4) formed on the cylindrical bus enclosure 1 in the longitudinal direction. The two-phase buses 7R and 7S is led to two (vertical outlets 2S), and the one-phase buses 7R and 7S is led to three (vertical outlets 2R). Branch buses 8 and 9 are led out from the tips of main bus conductors 7R, 7S and 7T of each phase.

As described above, three vertical outlets are formed in the longitudinal direction of a cylindrical bus enclosure and three horizontal outlets are formed in almost the same axial position as these vertical outlets in the circumferential direction. The three-phase main bus conductors are laid out to ensure that one side of a triangle having the apexes where three-phase main bus conductors are located is approximately parallel to these horizontal outlets. The main bus conductors are extended to the three vertical outlet positions sequentially starting from the main bus of the phase closest to the vertical outlets, and branch buses are led from the tip positions thereof to the vertical outlets and horizontal outlets.

This ensures the insulation distance of each phase where three phases are integrally incorporated, and further, allows branch buses to be lead out of one bus enclosure in two directions, whereby a compact configuration of a gas insulated switch gear is ensured.

The above embodiment shows the case of upward extension of branch buses in the vertical direction. It is apparent that downward extension of branch buses is possible in the same manner.

It is also apparent that the phase arrangement of main buses can be different from that described with reference to the aforementioned embodiment.

In the present invention, three vertical outlets are formed in the longitudinal direction of a cylindrical bus enclosure and three horizontal outlets are formed in almost the same axial position as these vertical outlets in the circumferential direction. The three-phase main bus are laid out to ensure that one side of a triangle having the apexes where three-phase main buses are located is approximately parallel to these horizontal outlets. The main buses are extended to the three vertical outlet positions sequentially starting from the main bus of the phase closest to the vertical outlets, and branch buses are led from the tip positions thereof to the vertical outlets and horizontal outlets. This ensures the insulation distance of each phase where three phases are integrally incorporated, and further, allows branch buses to be lead out of one bus enclosure in two directions, whereby a compact configuration of a gas insulated switch gear is ensured.

What is claimed is:

1. A three-phase integrated gas insulated bus comprising:
    a cylindrical bus enclosure provided with three vertical outlets in the longitudinal direction and three horizontal outlets at almost the same axial position as said vertical outlets in the circumferential direction, and
    three-phase main buses each located at the apexes of a triangle in said cylindrical bus enclosure and arranged so that one side of the triangle is approximately parallel to said horizontal outlets;
    said three-phase integrated gas insulated bus further characterized in that
    the three-phase main buses are extended to said three vertical outlet positions sequentially starting from the main bus of the phase closest to said vertical outlets, and
    branch buses are led from the tip positions thereof to said vertical outlets and horizontal outlets.

2. A three-phase integrated gas insulated bus comprising:

an insulated gas-filled cylindrical bus enclosure provided with three vertical outlets provided in a straight line in the longitudinal direction and three horizontal outlets in a straight line at almost the same axial position as said vertical outlets in the circumferential direction, and three-phase main buses each located at the apexes of a triangle in said cylindrical bus enclosure and arranged so that one side of the triangle is approximately parallel to said horizontal outlets;

said three-phase integrated gas insulated bus further characterized in that the three-phase main buses are extended to said three vertical outlet positions sequentially starting from the main bus of the phase closest to said vertical outlets, and branch buses are led from the tip positions thereof to said vertical outlets and horizontal outlets.

3. A three-phase integrated gas insulated bus comprising:

an insulated gas-filled cylindrical bus enclosure provided with three vertical outlets provided in a straight line on the upper surfaces in the axial direction, and three horizontal outlets in a straight line at almost the same axial position as said vertical outlets in the circumferential direction, and three-phase main buses each located at the apexes of a triangle in said cylindrical bus enclosure and arranged so that one side of the triangle is approximately parallel to said horizontal outlets;

said three-phase integrated gas insulated bus further characterized in that the three-phase main buses are extended to said three vertical outlet positions sequentially starting from the main bus of the phase closest to said vertical outlets, and branch buses are led in the upward and horizontal directions from the tip positions thereof to said vertical outlets and horizontal outlets.

4. A three-phase integrated gas insulated bus comprising:

an insulated gas-filled cylindrical bus enclosure provided with three vertical outlets in a straight line on the upper surfaces in the axial direction, and three horizontal outlets in a straight line at almost the same axial position as said vertical outlets in the circumferential direction, and three-phase main buses each located at the apexes of a triangle in said cylindrical bus enclosure and arranged so that one side of the triangle is approximately parallel to said horizontal outlets;

said three-phase integrated gas insulated bus further characterized in that the three-phase main buses are extended to said three vertical outlet positions sequentially starting from the main bus of the phase closest to said vertical outlets in the order of high, middle and low positions, and branch buses are led in the upward and horizontal directions from the tip positions thereof to said vertical outlets and horizontal outlets.

5. A three-phase integrated gas insulated bus comprising:

an insulated gas-filled cylindrical bus enclosure provided with three vertical outlets provided in a straight line on the upper surfaces in the axial direction, and three horizontal outlets in a straight line at almost the same axial position as said vertical outlets in the circumferential direction, and three-phase main buses each located at the apexes of an isosceles triangle in said cylindrical bus enclosure and arranged so that the base of the isosceles triangle is approximately parallel to said horizontal outlets;

said three-phase integrated gas insulated bus further characterized in that the three-phase main buses are extended to said three vertical outlet positions sequentially starting from the main bus of the phase closest to said vertical outlets in the order of high, middle and low positions, and branch buses in the upward and horizontal directions from the tip positions thereof are bent and led to said vertical outlets and horizontal outlets.

* * * * *